(12) United States Patent
Katsumoto et al.

(10) Patent No.: US 7,348,095 B2
(45) Date of Patent: Mar. 25, 2008

(54) BATTERY AND METHOD FOR MANUFACTURING THE SAME

(75) Inventors: Masumi Katsumoto, Fujisawa (JP);
Hideki Kasahara, Naka-gun (JP);
Satoshi Yoneyama, Hiratsuka (JP);
Yoshihiro Boki, Fujisawa (JP);
Masaharu Miyahisa, Fujisawa (JP);
Hideyuki Kumakiri, Chigasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 735 days.

(21) Appl. No.: 10/340,927

(22) Filed: Jan. 13, 2003

(65) Prior Publication Data

US 2003/0134192 A1    Jul. 17, 2003

(30) Foreign Application Priority Data

Jan. 15, 2002   (JP) ............................. 2002-005599
Apr. 16, 2002   (JP) ............................. 2002-113482

(51) Int. Cl.
*H01M 4/00*   (2006.01)
*H01M 6/10*   (2006.01)
*H01M 2/04*   (2006.01)

(52) U.S. Cl. ........................ 429/94; 429/176
(58) Field of Classification Search ................ 429/176, 429/94, 40
See application file for complete search history.

(56) References Cited

U.S. PATENT DOCUMENTS 5,958,620 A * 9/1999 Nagaura ..................... 429/164
6,168,883 B1 * 1/2001 Urry ........................... 429/159
6,465,122 B1 * 10/2002 Kitaoka et al. ............... 429/54
6,849,357 B1 * 2/2005 Kasahara et al. ............ 429/163

FOREIGN PATENT DOCUMENTS

JP   58-112259   7/1983
JP   63-221551   9/1988

* cited by examiner

*Primary Examiner*—Patrick Joseph Ryan
*Assistant Examiner*—Ben Lewis
(74) *Attorney, Agent, or Firm*—Jordan and Hamburg LLP

(57) ABSTRACT

After accommodating an electrode group in a battery case having a substantially square transverse cross section, making an opening head of the battery case into a cylindrical shape through compression molding, an annular groove is formed by pressing a groove-forming roller sideways against a side surface of the opening head while rotating the battery case with a pressing force being kept applied to the battery case in an axial direction from the opening portion side, or alternatively pressing the groove-forming roller against the opening head from the side surface thereof and concurrently displacing the groove-forming roller in a direction toward the opening portion of the battery case while rotating the battery case. After having an annular supporting portion that bulges inward of the battery case support an opening-sealing member, the opening-sealing member is fixed through caulking by bending the opening end portion of the battery case inward, whereby a battery is manufactured.

16 Claims, 8 Drawing Sheets

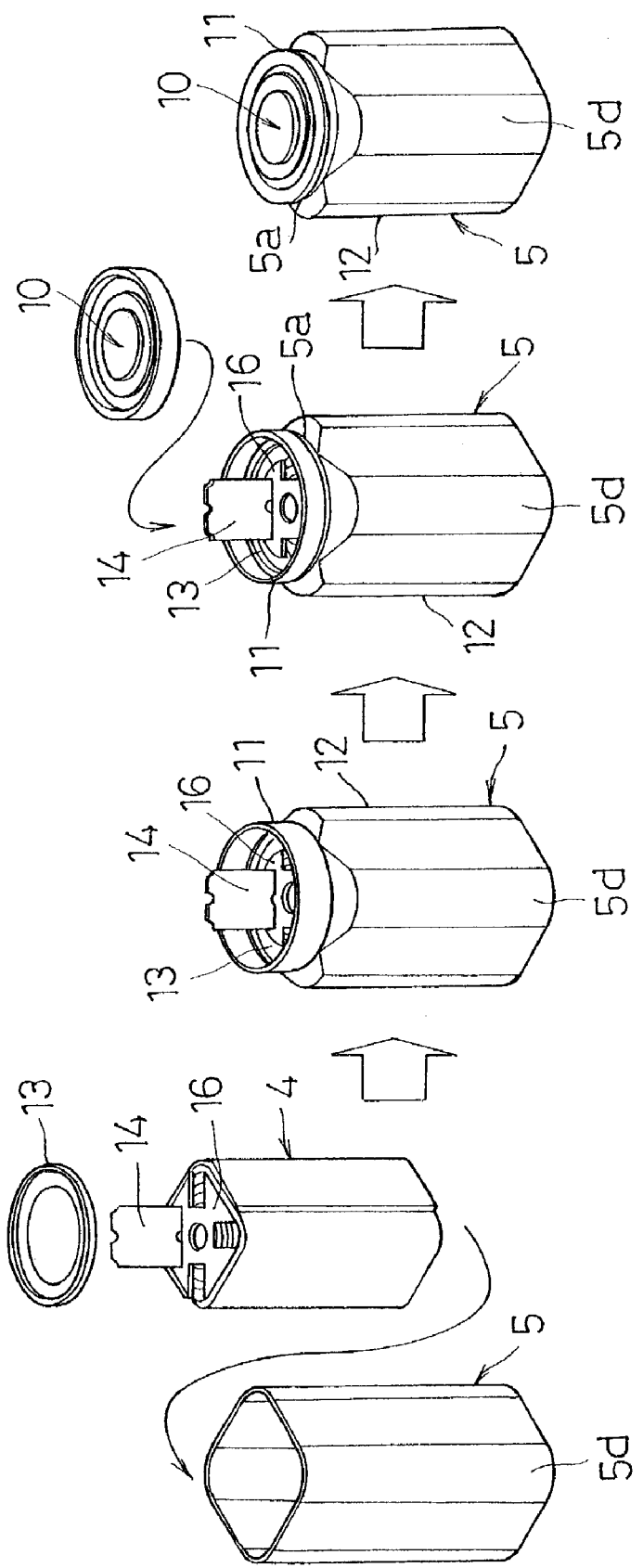

BATTERY AND METHOD FOR MANUFACTURING THE SAME

The present disclosure relates to subject matter contained in priority Japanese Patent Application Nos. 2002-5599 and 2002-113482, filed on Jan. 15, 2002 and Apr. 16, 2002, respectively, the contents of which is herein expressly incorporated by reference in its entirety.

BACKGROUND OF THE INVENTION

1. Field of the Invention

The present invention relates to a sealed battery manufactured by sealing power generating elements, such as an electrode group and an electrolyte solution, in a battery case, and to a method for manufacturing the same.

2. Description of Related Art

With the advance of electrical equipment of various portable types, the development of batteries serving as the driving source becomes of increasing importance. Of all the types of batteries, small-sized rechargeable batteries, such as nickel-metal hydride rechargeable batteries and lithium ion rechargeable batteries, have been used as driving sources in hybrid vehicles in addition to cellar phones, notebook-sized personal computers, video cameras, etc., and the demand has been on the increase.

Such batteries are classified broadly into a cylindrical type and a prismatic type. The cylindrical battery has high energy density per unit volume because of the structure in which a spiral electrode group fabricated by winding strip-like positive electrode plate and negative electrode plate with a separator being interposed therebetween is accommodated in a battery case. On the other hand, as shown in FIG. 7, the prismatic battery generally has a structure in which an electrode group 104 fabricated by sequentially depositing a positive electrode plate 101 and a negative electrode plate 102 with a separator 103 being interposed therebetween is accommodated in a battery case 105. Comparison in terms of the structures reveals that the cylindrical battery excels in productivity and costs less. However, comparison with a comparative example of a battery of the invention shown in FIG. 5B reveals that, when a battery pack 17B is formed by accommodating a plurality of cylindrical batteries B in a pack case 18, a dead space is increased and space efficiency is thereby deteriorated; what is worse, the stability of the batteries within the housing space is poor. Hence, the cylindrical battery is not suitable for use in reducing the size and the thickness of electrical equipment.

On the contrary, the prismatic battery is advantageous in that a plurality of batteries can be accommodated in the housing space at high space efficiency and in a stable manner. However, since the electrode group 104 is of a laminated structure as described above, when the number of electrode plates 101 and 102 is increased with the aim of increasing the battery capacity, the production costs are increased because of the need to increase the number of connection lines 106 (see FIG. 7) and the like. Besides, the prismatic battery has a drawback that it is not readily sealed in comparison with the cylindrical battery, and thus, it becomes less reliable.

In the case of the prismatic battery, a popular method adopted as the sealing method is to weld a junction portion between an opening-sealing plate and a case opening through laser welding. This method, however, not only increases the manufacturing costs, but also makes it difficult to manage the laser condition in stabilizing the welding state, and therefore, cannot be recommended as a highly reliable method. Further, in the case of the prismatic battery as shown in FIG. 7, Japanese Patent Laid-Open Publication No. Sho. 63-221551, for example, discloses an opening sealing method that seals an opening with an opening-sealing member 110 through caulking as with the cylindrical battery. According to this method, however, it is difficult to form an annular groove, needed to seal the opening with the sealing member 110, on the side surface of the battery case. Further, when the opening end portion of the prismatic tubular case is caulked, distortion occurs often at each corner portion. Hence, this method has a problem that the airtightness is poor in comparison with the case of caulking the cylindrical battery.

This problem would be eliminated by a method of providing, as shown in FIG. 9, a cylindrical opening head 211 to a battery case 205 having a prismatic tubular barrel portion 212, and then caulking the opening head 211. As an example of such a caulking method, a manufacturing method of a battery employing the caulking method disclosed in, for example, Japanese Patent Laid-Open Publication No. Sho. 58-112259 will now be described.

As shown in FIG. 8, after an electrode group (not shown) is accommodated in the battery case 205, the bottom portion of the battery case 205 is inserted into a holder 207. Then, an opening of the battery case 205 is fixed by an upper-portion fixing device 208 while a pressing force is kept applied to the battery case 205 in the axial direction from the bottom portion side as indicated by an arrow. Subsequently, the battery case 205 is rotated by rotating the upper-portion fixing device 208 at a certain number of rotations. Under these conditions, a groove-forming roller 209 is press-adhered to the side surface of the battery case 205 while the battery case 205 is kept pressed in the axial direction from the bottom portion side, whereby an annular groove 205a is formed in the vicinity of the opening. While having an annular supporting portion 205b that bulges inward due to the annular groove 205a support an opening-sealing member 210 (FIG. 9), the opening of the battery case 205 is bent inward and the opening-sealing member 210 is thereby fixed between the opening end portion and the annular supporting portion 205b through caulking. Consequently, the battery is sealed airtight.

However, when the conventional annular groove forming method as described above is applied to the case of manufacturing a battery having the prismatic tubular barrel portion 212 and the cylindrical opening head 211 as shown in FIG. 9, the pressing force applied to the battery case 205 in the axial direction from the bottom portion side makes it difficult to smoothly supply the material used to form the annular groove 205a from the barrel portion 212 side. Hence, when the annular groove 205a is formed at the boundary portion between the opening head 211 and the barrel portion 212, the boundary portion is extended locally by the groove-forming roller 209 while the material is hardly supplied. This reduces the thickness of the locally extended portion, and causes a problem, such as deformation and breaking.

Hence, when the annular groove 205a is formed by the conventional method, as shown in FIG. 6B, the annular groove 205a has to be formed while securing a cylindrical portion 205c of an adequate size below the groove 205a in order to ensure a supply of the material. However, a useless space is left at the inner side of the cylindrical portion 205c, which raises a problem that the volume energy density is reduced.

SUMMARY OF THE INVENTION

In light of the foregoing, the present invention provides a highly reliable sealed battery through caulking processing by forming an annular groove at a position that causes no loss in the interior space of the battery case while exploiting the characteristic of a prismatic battery that satisfactory space efficiency is achieved, and a method for manufacturing the same.

In order to achieve the above-mentioned object, a battery of the invention is a battery, which accommodates an electrode group and an electrolyte solution in a prismatic tubular barrel portion of a battery case and is sealed by: having an annular supporting portion that bulges inward due to an annular groove formed on a side surface of a cylindrical opening head of the battery case support an opening-sealing member; and bending an opening end portion of the battery case inward, and thereby fixing the opening-sealing member between the opening end portion and the annular supporting portion through caulking, wherein the annular groove is positioned at a boundary portion between the opening head and the barrel portion.

According to this battery, the annular groove is formed in the cylindrical opening head, and the opening-sealing member is fixed between the annular supporting portion and the opening end portion of the battery case through caulking while the battery exhibits the characteristic of a prismatic battery that the battery is accommodated in a housing space at high space efficiency and in a stable manner. Hence, the opening is readily sealed while ensuring excellent air-tightness. Also, since the annular groove is positioned at the boundary portion between the cylindrical opening head and the prismatic tubular barrel portion, losses in the interior space of the battery case are reduced.

The battery is preferably arranged in such a manner that the barrel portion of the battery case has a substantially square transverse cross section having each corner portion being formed into a specific rounded shape.

Also, the battery is preferably arranged in such a manner that the electrode group is fabricated by winding strip-like positive electrode plate and negative electrode plate with a separator being interposed therebetween to have a transverse cross section that matches with the transverse cross section of the barrel portion of the battery case.

A method for manufacturing a battery according to the present invention includes: accommodating an electrode group in a battery case having a substantially square transverse cross section provided with specific rounded corner portions; making an opening head of the battery case into a cylindrical shape through compression molding; forming an annular groove by pressing a groove-forming roller sideways against a side surface of the opening head while rotating the battery case with a pressing force being kept applied to the battery case in an axial direction from an opening portion side; filling the battery case with an electrolyte solution after having an annular supporting portion that bulges inward from the annular groove support an opening-sealing member; and sealing the battery case by bending an opening end portion of the battery case inward to fix the opening-sealing member between the opening end portion and the annular supporting portion through caulking.

According to this method for manufacturing the battery, the annular groove is formed in the cylindrical opening head, and the opening-sealing member is fixed between the annular supporting portion and the opening end portion of the battery case through caulking. Hence, it is possible to manufacture a battery that not only is readily sealed but also excels in air-tightness while maintaining the characteristic of a prismatic battery that the battery is accommodated in a housing space at high space efficiency and in a stable manner.

Hence, unlike the conventional annular groove forming method, the need to leave a cylindrical portion below the boundary portion in ensuring a supply of the material is eliminated, whereby losses in the interior space of the battery case are reduced. Moreover, since the electrode group is accommodated in the battery case having a substantially square transverse cross section provided with specific rounded corner portions, plastic deformation readily takes place when the cylindrical opening head and the annular groove are formed.

Also, another method for manufacturing a battery according to the invention includes: accommodating an electrode group in a battery case having a substantially square transverse cross section provided with specific rounded corner portions; making an opening head of the battery case into a cylindrical shape through compression molding; forming an annular groove by pressing a groove-forming roller against the opening head from a side surface thereof and concurrently displacing the groove-forming roller in a direction toward an opening portion of the battery case while rotating the battery case; filling the battery case with an electrolyte solution after having an annular supporting portion that bulges inward from the annular groove support an opening-sealing member; and sealing the battery case by bending an opening end portion of the battery case inward to fix the opening-sealing member between the opening end portion and the annular supporting portion through caulking.

According to this manufacturing method of the battery, the annular groove is formed in the cylindrical opening head, and the opening-sealing member is fixed between the annular supporting portion and the opening end portion of the battery case through caulking. Hence, it is possible to manufacture a battery that not only is readily sealed but also excels in air-tightness while maintaining the characteristic of a prismatic battery that the battery is accommodated in a housing space at high space efficiency and in a stable manner. Also, by forming the annular groove by pressing the groove-forming roller sideways against the side surface of the opening head and concurrently displacing the groove-forming roller in the direction toward the opening portion of the battery case, it is possible to supply a sufficient material from the cylindrical opening head side.

Hence, unlike the conventional annular groove forming method, the need to leave a cylindrical portion below the boundary portion in ensuring a supply of the material is eliminated, whereby losses in the interior space of the battery case are reduced. Moreover, since the electrode group is accommodated in the battery case having a substantially square transverse cross section provided with specific rounded corner portions, plastic deformation readily takes place when the cylindrical opening head and the annular groove are formed.

It is preferred that a curvature radius of the rounded portion be set in a range from 4 to 9 mm.

Also, each of the manufacturing methods can be preferably arranged in such a manner that the electrode group is press-fit into the battery case after the electrode group is made into a column-like shape by winding strip-like positive electrode plate and negative electrode plate with a separator being interposed therebetween, and subjected to compression molding to have a transverse cross section that matches with the transverse cross section of the battery case.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 3A through FIG. 3D are perspective views showing a manufacturing method of the battery of the embodiment step by step;

DETAILED DESCRIPTION OF THE PREFERRED EMBODIMENTS

Preferred embodiments of the invention will be described with reference to the accompanying drawings.

Figure 1:
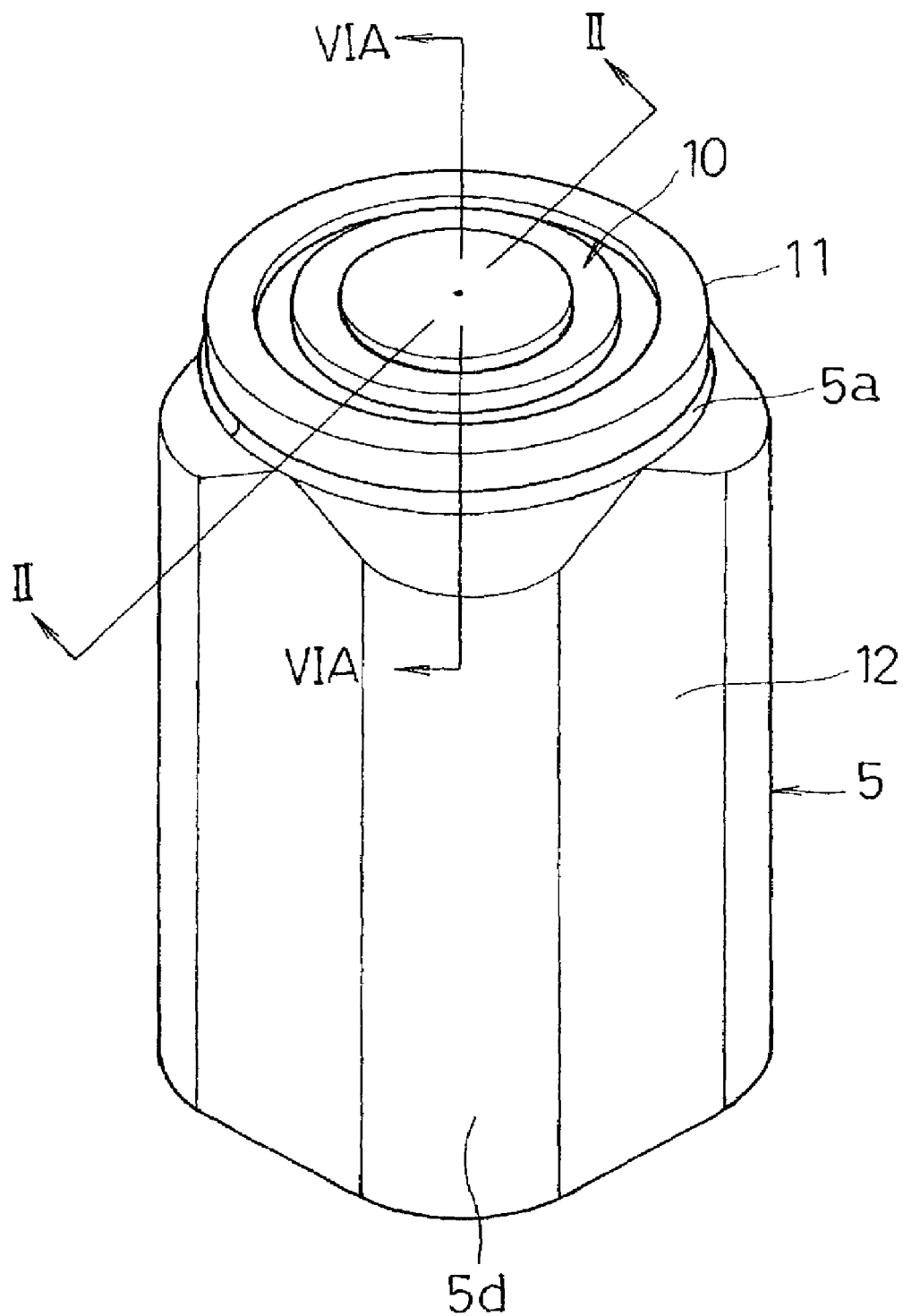
FIG. 1 is a perspective view showing a battery according to one embodiment of the invention.
Figure 2:
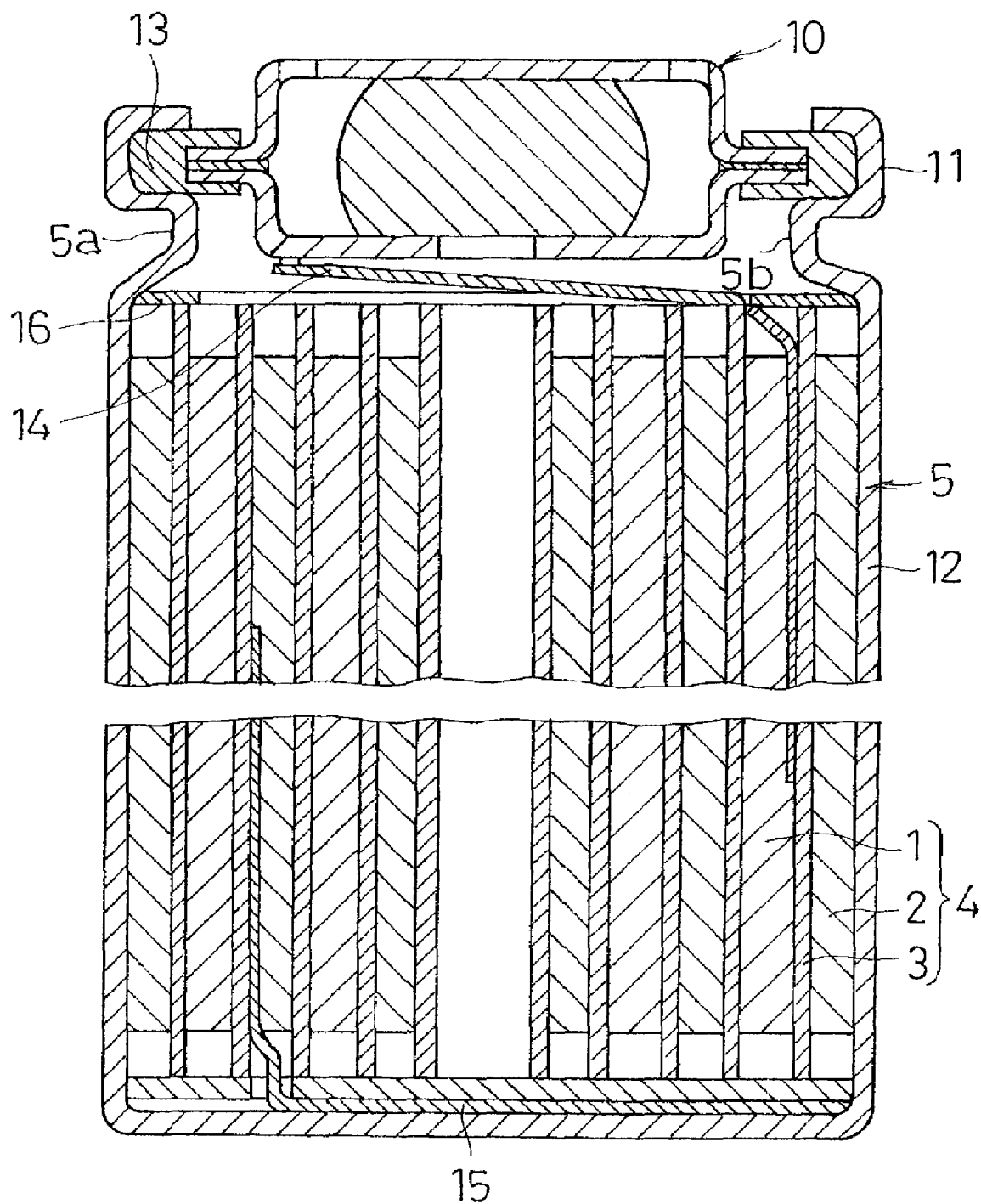
FIG. 2 is a cross section taken along the line II-II of FIG. 1.

FIG. 1 is a perspective view showing a battery according to one embodiment of the invention. FIG. 2 is a cross section taken along the line II-II of FIG. 1. The battery includes a bottomed prismatic tubular battery case 5 having a substantially square transverse cross section with each corner portion being made into a specific rounded shape. An electrode group 4, which is fabricated by winding strip-like positive electrode plate 1 and negative electrode plate 2 with a separator 3 being interposed therebetween, is accommodated in a barrel portion 12 of the battery case 5, and the battery case 5 is filled with an electrolyte solution.

An opening head 11 of the battery case 5 is made into a cylindrical shape. An opening-sealing member 10 is placed on an annular supporting portion 5b that bulges inward due to an annular groove 5a formed on the side surface of the head 11 so as to have the portion 5b support the member 10 through an insulation gasket 13. Then, the opening end portion of the opening head 11 is bent inward, and the opening-sealing member 10 is thereby fixed between the opening end portion and the annular supporting portion 5b through caulking. The battery case 5 is thus sealed.

The electrode group 4 is made into a column-like shape by winding strip-like positive electrode plate 1, negative electrode plate 2, and separator 3 in spiral, and then subjected to compression molding using a die, so that the electrode group 4 is made into a substantially square shape that matches with the transverse cross section of the battery case 5 and press-fit into the battery case 5. Consequently, when the electrode group 4 is inserted into the barrel portion 12, the tension is slightly relaxed, which gives rise to slight deformation such that allows the electrode group 4 to swell due to the restorability to the original column-like shape. The electrode group 4 is thus closely adhered to the inner surface of the battery case 5.

The battery case 5 of the battery has a corner portion of a specific rounded shape, for example, a rounded portion 5d with a curvature radius of 4 to 9 mm, at each corner portion. This arrangement makes the processing of the battery case 5 easier, and allows plastic deformation to take place readily when the cylindrical opening head 11 and the annular groove 5a are formed. Further, the battery achieves excellent resistance to pressure when an internal pressure rises due to overcharge, over discharge, etc. Moreover, no dead space is left when the column-like wound electrode group 4 is subjected to compression molding and then press-fit into the battery case 5 as described above. Furthermore, although it will be described below, in the case of forming battery packs 17A and 17B by accommodating a plurality of batteries arranged in parallel in a pack case 18, or in the case of accommodating a plurality of batteries in a battery housing portion of electrical equipment, it is possible to forestall the occurrence of inconvenience, such as damage or a dent caused by physical contact between the batteries.

FIG. 3A through FIG. 3D are perspective views showing the manufacturing method of the present embodiment step by step. Initially, as shown in FIG. 3A, the battery case 5 is made into a bottomed prismatic tubular shape having the substantially square transverse cross section provided with the aforementioned rounded portions 5d. Then, after the electrode group 4 is fabricated by depositing the positive electrode plate 1 and the negative electrode plate 2 with the separator 3 being interposed therebetween and then winding these components in spiral, the electrode group 4 is subjected to compression molding to have the substantially square transverse cross section that matches with the transverse cross section of the battery case 5. A positive electrode collector 16 is welded to the top end surface of the electrode group 4, and a positive electrode lead piece 14 that protrudes upward is welded on the positive electrode collector 16. Also, as shown in FIG. 2, a negative electrode collector 15 formed integrally with a negative lead piece is welded to the bottom end surface of the electrode group 4. The electrode group 4 fabricated in this manner is inserted into the battery case 5 as indicated by an arrow of FIG. 3A.

After the electrode group 4 is inserted into the battery case 5, a welding electrode rod is inserted through a hole made at the center of the electrode group 4. The lead piece of the negative electrode collector 15 is thus depressed to protrude downward and welded to the bottom surface of the battery case 5 through resistance welding.

Subsequently, a portion of the battery case 5 in the vicinity of the opening is subjected to compression molding using a die. Then, as shown in FIG. 3B, the cylindrical opening head 11 is formed, and the insulation gasket 13 is fit in the inside.

Then, as shown in FIG. 3C, the annular groove 5a is formed on the side surface of the opening head 11, and the electrode group 4 is fixed in the interior of the battery case 5. Methods of forming the annular groove 5a will now be described with reference to FIG. 4A and FIG. 4B.

Figure 4A:
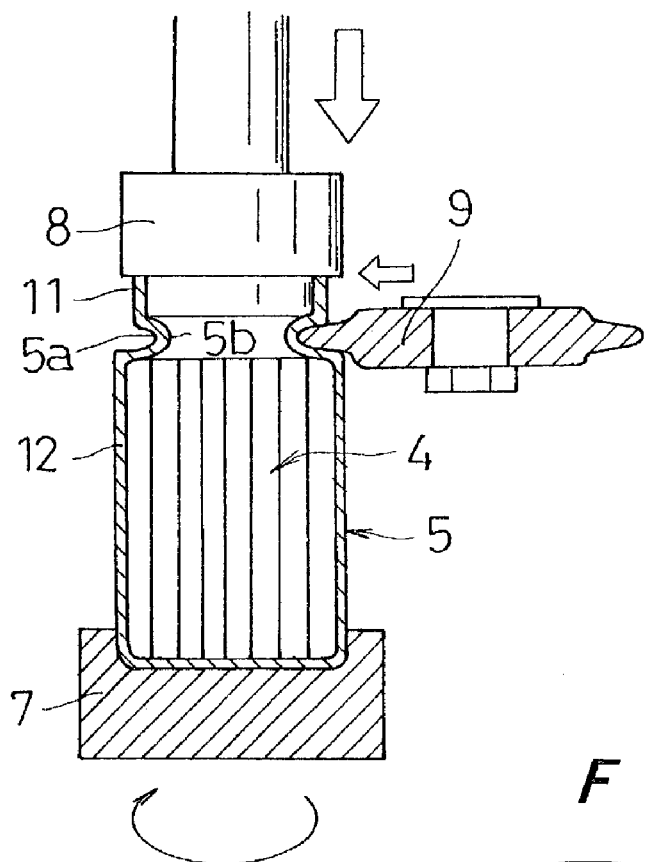
FIG. 4A and FIG. 4B are cross sections respectively showing a forming method of an annular groove in the battery of the embodiment.

FIG. 4A is a cross section showing a first forming method of the annular groove 5a. According to the first forming method, after the bottom portion of the battery case 5 is inserted in a holder 7, an upper-portion fixing device 8 is pressed toward the holder 7 at a certain pressure, whereby the opening head 11 of the battery case 5 is fixed by the fixing device 8. Subsequently, the battery case 5 is rotated by rotating the holder 7 at a certain number of rotations. A groove-forming roller 9 is pressed sideways against the side surface of the opening head 11 while rotating the battery case 5 with a certain pressing force being kept applied to the battery case 5 in the axial direction from the opening portion side as described above, whereby the annular groove 5a is formed.

Figure 4B:
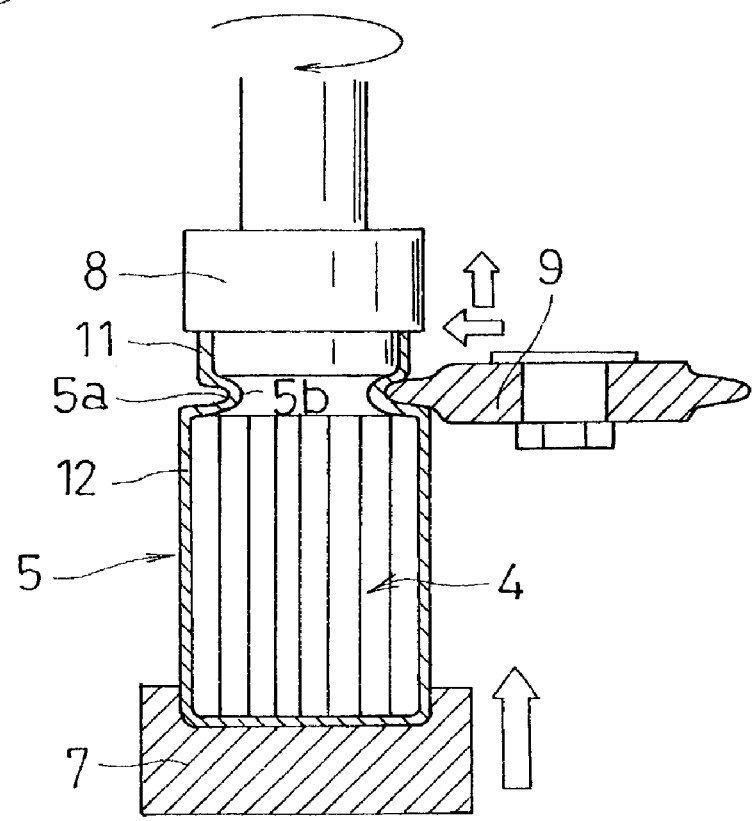

FIG. 4B is a cross section showing a second forming method of the annular groove 5a. According to the second forming method, after the bottom portion of the battery case 5 is inserted in the holder 7, the holder 7 is pressed against the upper-portion fixing device 8 at a certain pressure, whereby the opening head 11 is fixed by the fixing device 8. Under these conditions, the battery case 5 is rotated by rotating the upper-portion fixing device 8 at a certain number of rotations. Then, with a certain pressing force being kept applied to the battery case 5 in the axial direction from the bottom portion side, the groove-forming roller 9 is pressed sideways against the side surface of the opening head 11 and concurrently displaced in the direction toward the opening of the battery case 5 as indicated by an arrow while rotating the battery case 5, whereby the annual groove 5a is formed.

After the annular groove 5a is formed by either of the above-described two methods, as shown in FIG. 3C, the battery case 5 is filled with an alkaline electrolyte solution of a certain quantity through the hole made at the center of the electrode group 4. Then, the opening-sealing member 10 is inserted into the battery case 5 through the opening so as to have the annular supporting portion 5b that bulges inward due to the annular groove 5a support the opening-sealing member 10 through the insulation gasket 13.

Then, as shown in FIG. 3D, the opening end portion of the opening head 11 is bent inward, and the opening-sealing member 10 is thereby fixed between the opening end portion and the annular supporting portion 5b through caulking. The battery case 5 is thus sealed, whereupon the battery is completed.

EXAMPLE

The following describes in detail one example of the invention. The electrode group 4 was fabricated by winding the strip-like positive electrode plate 1 containing nickel hydroxide as an active material and having the height of 34 mm, the width of 250 mm, and the thickness of 0.62 mm, and the strip-like negative electrode plate 2 containing a hydrogen-absorption alloy as an active material and having the height of 34 mm, the width of 310 mm, and the thickness of 0.36 mm with the separator 3 made of polypropylene having undergone hydrophilic treatment being interposed therebetween. The positive electrode collector 16 and the negative electrode collector 15 were welded to the top portion and the bottom portion of the electrode group 4, respectively.

Used as the battery case 5 was a metal case made of nickel-plated iron having a thickness of 0.3 mm and the height of 45 mm and also having a substantially square cross section with a side length of 21 mm whose respective corner portions were rounded by R6, to which the annular groove 5a was formed by the manufacturing steps described in FIG. 3A through FIG. 3D and the forming method described in FIG. 4A or FIG. 4B. A top 7-mm portion was subjected to compression molding to form the cylindrical opening head 11 having a diameter of 21 mm.

Initial charging and discharging were performed with the battery thus obtained, and a battery A having the height of 42 mm, the square transverse cross section with a side length of 21 mm, and a standard capacity of 3600 mAh was manufactured.

Comparative Example 1

A battery pack composed of the batteries A manufactured in the above-described manner, and a battery pack composed of cylindrical batteries B, manufactured as a comparative example to have the height of 42 mm, the diameter of 21 mm, and a standard capacity of 3000 mAh, were formed as battery packs 17A and 17B, respectively. The following will discuss the difference in space efficiency between the battery packs 17A and 17B.

Figure 5A:
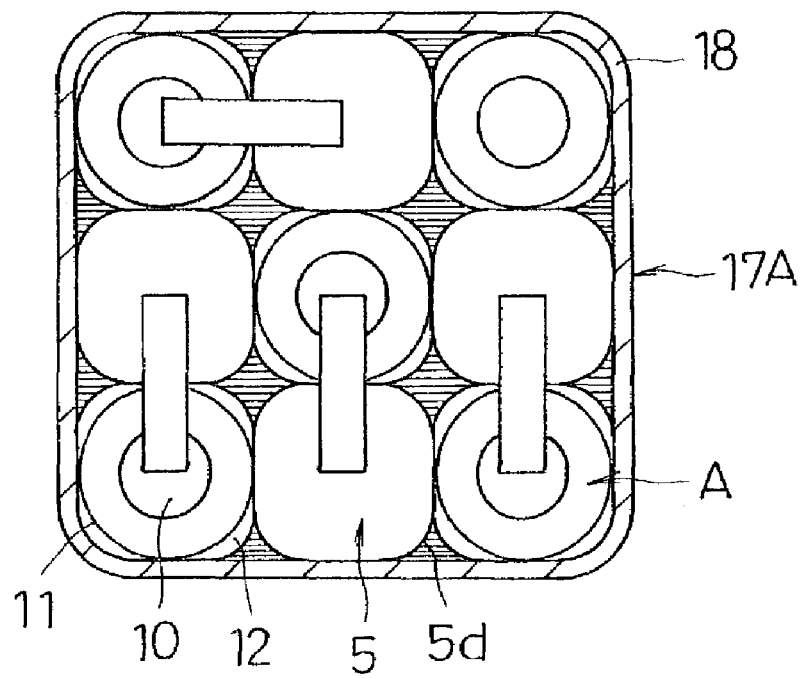
FIG. 5A is a plan view showing a battery pack composed of batteries of the invention.
Figure 5B:
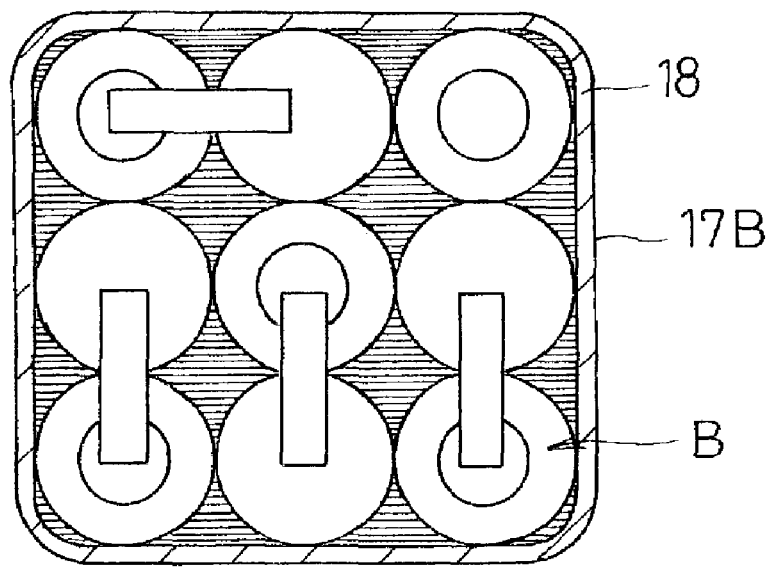
FIG. 5B is a plan view showing a battery pack composed of cylindrical batteries for comparison.

As one example, FIG. 5A and FIG. 5B respectively show the battery packs 17A and 17B that accommodate nine batteries A of the present example and nine batteries B of the comparative example in pack cases 18, respectively. Compared with the battery pack 17B accommodating the batteries B, the battery pack 17A accommodating the batteries A of the present example has a smaller remaining space hatched with horizontal parallel lines in the drawings, and thus, achieves excellent space efficiency. Moreover, since the batteries A have the rounded portions 5d, it is possible to forestall the occurrence of inconvenience, such as damage or a dent caused by physical contact between the batteries, when a battery pack is formed or when a plurality of batteries A are accommodated in the battery housing portion of electrical equipment. Further, the battery A is provided with the cylindrical opening head 11 so that the caulking method, which is generally applied to cylindrical batteries, can be adopted. In addition, the forming method of the annular groove 5a used to seal the cylindrical portion takes into account that the battery below the annular groove 5a is of the prismatic tubular shape, and thus changes the pressing direction or changes the displacement direction of the groove-forming roller 9. Accordingly, the battery A of the present example achieves satisfactory productivity while having the structure of the prismatic battery composed of the prismatic tubular barrel portion 12, while exhibiting the characteristic of the cylindrical battery that high reliability is achieved in regard to the opening-sealing portion.

The following will describe the structure of the annular groove 5a in comparison with the one formed by the conventional annular groove forming method.

Comparative Example 2

Figure 8:
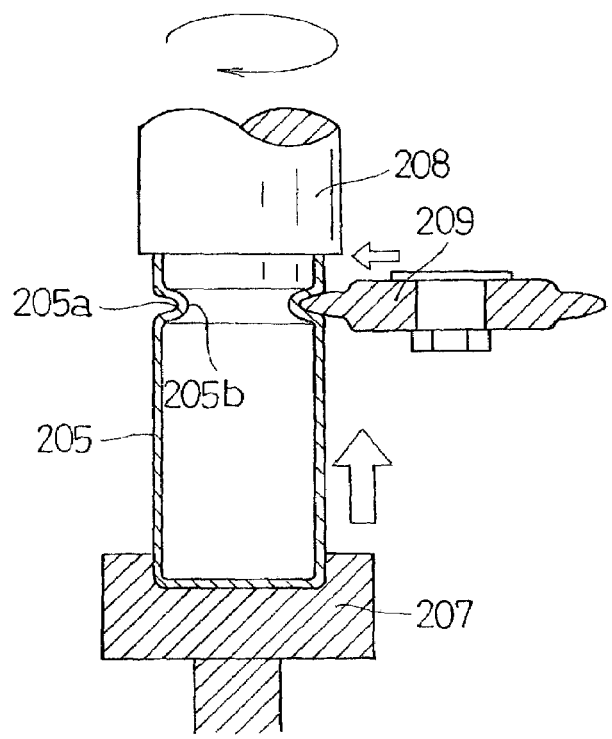
FIG. 8 is a cross section showing a forming method of an annular groove in a conventional cylindrical battery.
Figure 9:
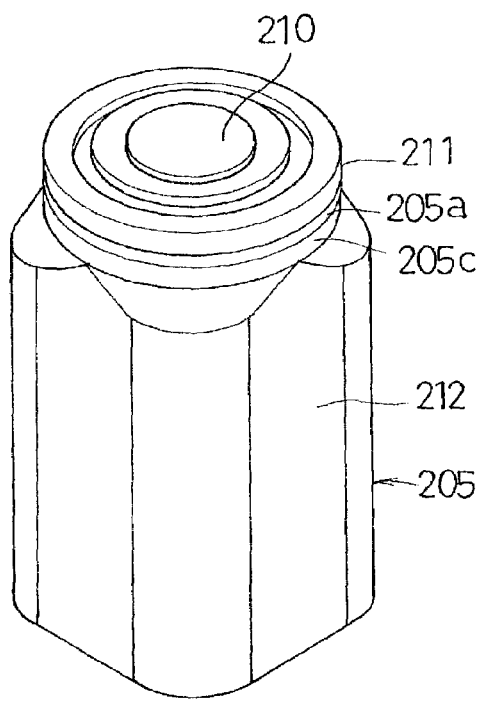
FIG. 9 is a perspective view showing a prismatic battery using a battery case having an annular groove formed by the conventional method.

In the comparative example 2, a battery was manufactured in the same manner as in the example above except that the method adopted to form the annular groove was that the groove-forming roller was press-adhered to the side surface of the boundary portion between the opening head and the barrel portion while the battery case was pressed from the bottom surface side as shown in FIG. 8 of the prior art (in the example above, the battery case is pressed from the opening portion side as shown in FIG. 4A).

Figure 6A:
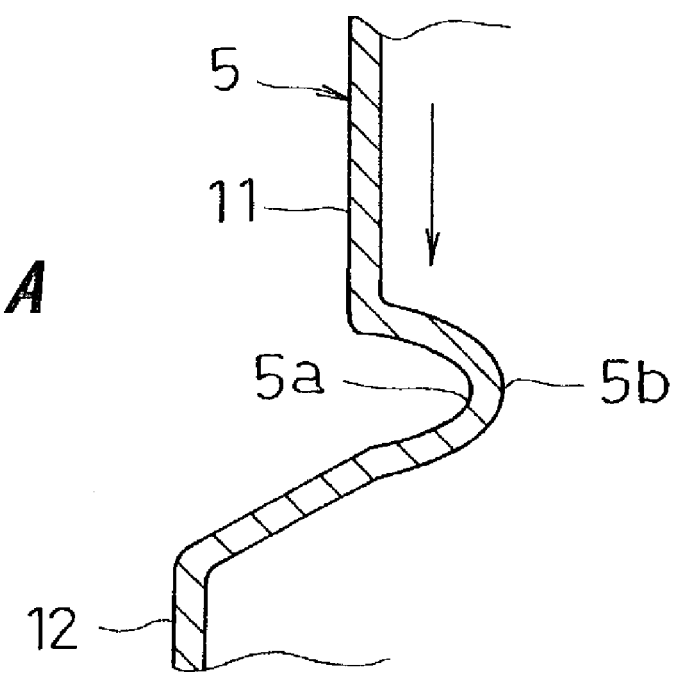
FIG. 6A is an enlarged view of a major portion cut along the line VIA-VIA of FIG. 1.
Figure 6B:
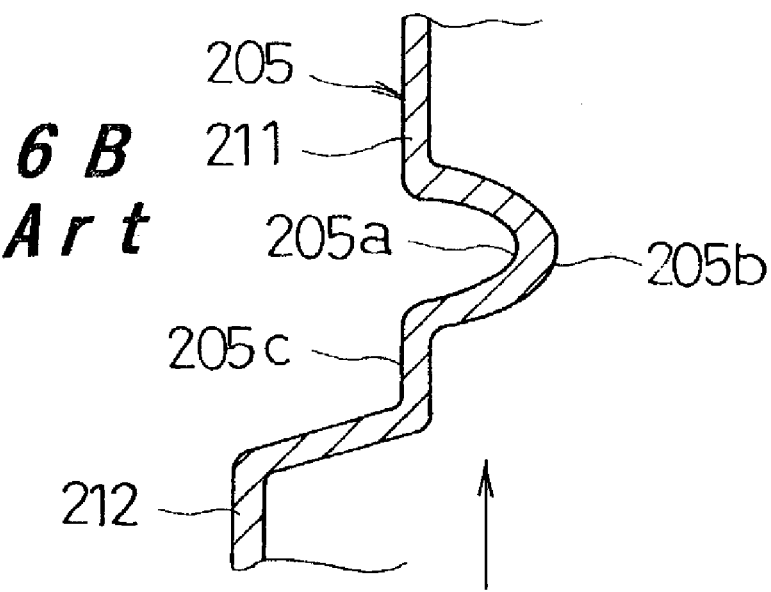
FIG. 6B is a cross section at an equivalent portion in a conventional battery for comparison.
Figure 7:
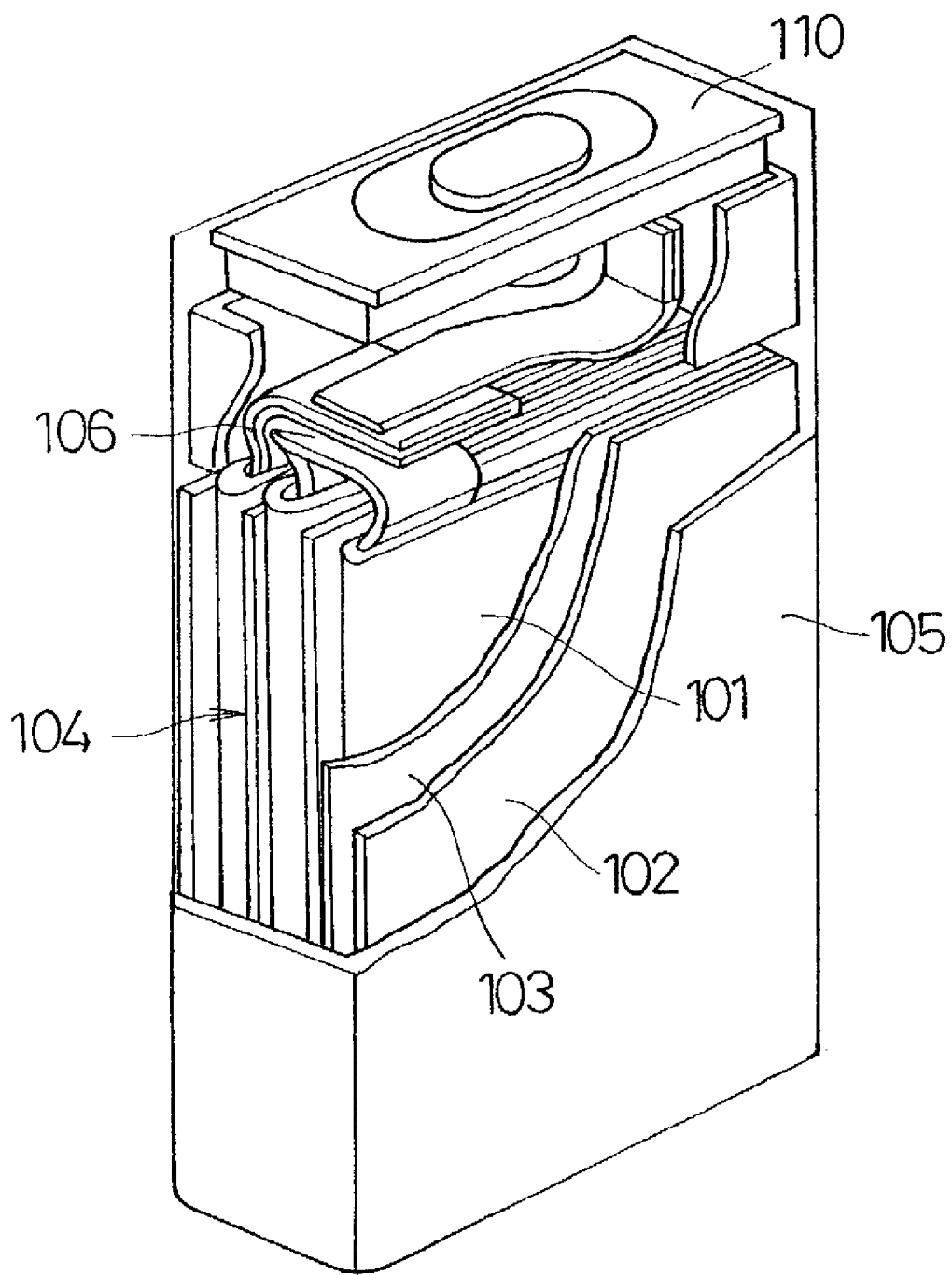
FIG. 7 is a perspective view showing one example of a conventional prismatic battery.

Consequently, since the material was hardly supplied from the bottom portion side, a portion to be made into the annular groove was extended locally by the groove-forming roller and the thickness became irregular, which frequently caused partial breaking or deformation. Hence, in order to form the annular groove 205a in the battery having the cylindrical opening head 11 and the prismatic tubular barrel portion 12, as shown in FIG. 6B, the annular groove 205a has to be formed while securing a cylindrical portion 205c of an adequate size below the annular groove 205a in order to ensure a supply of the material. This arrangement, however, leaves a useless space at the inner side of the cylindrical portion 205c, and raises a problem that there is a loss in the interior space of the battery case 205. In order to avoid this problem, in the present example, the annular groove 5a was formed by pressing the battery case 5 from the opening portion side as shown in FIG. 6A, or by changing the displacement direction of the groove-forming roller 9. This arrangement enables a satisfactory supply of the material, and ensures the uniform thickness at the boundary portion between the cylindrical opening head 11 and the prismatic tubular barrel portion 12. Consequently, the annular groove 5a having excellent dimensional stability is formed, and losses in the interior space are reduced.

The example above described a case of a nickel-metal hydride rechargeable battery that uses a nickel electrode as the positive electrode plate 1 and a hydrogen-absorption alloy electrode as the negative electrode plate 2. It should be appreciated, however, that the same advantages are achieved with other batteries, such as nickel-cadmium rechargeable battery and a lithium ion rechargeable battery.

As has been described, according to the invention, it is possible to provide a battery that ensures highly reliable air-tightness as well as reducing losses in the interior space of the battery case through caulking that utilizes the annular groove formed at the boundary position between the cylindrical opening head and the prismatic tubular barrel portion by fully exploiting the characteristic of a prismatic battery that satisfactory space efficiency is achieved when a plurality of batteries are accommodated, and the manufacturing method thereof.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery comprising:
a battery case having a prismatic tubular barrel portion defining a prismatic tubular barrel cross section transverse to a barrel axis, and said prismatic tubular barrel portion having a first end, a second end, and corner portions, said battery case having a bottom portion at said first end of the prismatic tubular barrel portion;
said battery case having a slanted wall portion having a slanted wall bottom end adjoining said second end of said prismatic tubular barrel portion and extending to a slanted wall top end while tapering inward toward said barrel axis at a slanted angle slanted relative to said barrel axis, said slanted wall having a straight contour taken in a radial plane of said battery case which bisects diagonally opposed ones of said corner portions, said straight contour extending from said slanted wall bottom end to said slanted wall top end;
said battery case having an annular groove portion which extends inwardly toward said barrel axis, said annular groove portion having top and bottom groove walls opposing one another to define an extent of said annular groove portion;
said bottom groove wall having an outer perimeter adjoining said slanted wall top end and said bottom groove wall extending inwardly from said slanted wall top end at a pitch which is initially less steep than a pitch of said slanted wall along said straight contour, and said top groove wall having a top groove wall upper surface forming an annular supporting portion and having an outer diameter perimeter;
a cylindrical opening head portion having a bottom end adjoining and extending upward from said outer diameter perimeter of said top groove wall;
an electrode group and an electrolyte solution accommodated in the prismatic tubular barrel portion of the battery case;
said electrode plate group having a positive electrode plate and a negative electrode plate with a separator interposed therebetween and wound about a winding axis disposed parallel to said barrel axis to form said electrode plate group; and
an opening-sealing member disposed within said cylindrical opening head portion and supported by the annular supporting portion, the battery being sealed by bending an opening end portion of said cylindrical opening head portion inward to fix the opening-sealing member between the opening end portion and the annular supporting portion.

2. The battery according to claim 1, wherein said prismatic tubular barrel cross section is a substantially square transverse cross section having flat sides and said corner portions are formed into a rounded shape connecting said flat sides.

3. The battery according to claim 2, wherein said positive electrode plate and said negative electrode plate are elongated strips.

4. The battery according to claim 3, wherein:
said electrode plate group is formed into a substantially column shape by winding said positive electrode plate and said negative electrode plate with said separator being interposed therebetween;
said electrode plate group is subjected to compression molding to compress said column shape to have said transverse cross section that conforms with the prismatic tubular barrel cross section; and
said electrode plate group is press-fit into said prismatic tubular barrel portion of said battery case after said compression molding.

5. The battery according to claim 4, wherein said annular groove is positioned at a boundary portion between the cylindrical opening head portion and said flat sides of the prismatic tubular barrel portion such that portions of said outer perimeter of said bottom groove wall adjoin said flat sides via a curved transition portion and another portion of said outer perimeter of said bottom groove wall adjoins said slanted wall at a top of said straight contour of said slanted wall.

6. The battery according to claim 2, wherein:
said electrode plate group is formed into a substantially column shape by winding said positive electrode plate and said negative electrode plate with said separator being interposed therebetween;
said electrode plate group is subjected to compression molding to compress said column shape to have said transverse cross section that conforms with the prismatic tubular barrel cross section; and
said electrode plate group is press-fit into said prismatic tubular barrel portion of said battery case after said compression molding.

7. The battery according to claim 6, wherein said annular groove is positioned at a boundary portion between the cylindrical opening head portion and said flat sides of the prismatic tubular barrel portion such that portions of said outer perimeter of said bottom groove wall at an outmost portion of said annular groove adjoin said flat sides via a curved transition portion and another portion of said outer perimeter of said bottom groove wall adjoins said slanted wall at a top of said straight contour of said slanted wall.

8. The battery according to claim 1, wherein:
said electrode plate group is formed into a substantially column shape by winding said positive electrode plate and said negative electrode plate with said separator being interposed therebetween;
said electrode plate group is subjected to compression molding to compress said column shape to have said transverse cross section that conforms with the prismatic tubular barrel cross section; and
said electrode plate group is press-fit into said prismatic tubular barrel portion of said battery case after said compression molding.

9. The battery according to claim 8, wherein said annular groove is positioned at a boundary portion between the cylindrical opening head portion and said flat sides of the prismatic tubular barrel portion such that portions of said outer perimeter of said bottom groove wall at an outmost portion of said annular groove adjoin said flat sides via a curved transition portion and another portion of said outer perimeter of said bottom groove wall adjoins said slanted wall at a top of said straight contour of said slanted wall.

10. The battery according to claim 9, wherein said positive electrode plate and said negative electrode plate are elongated strips.

11. The battery according to claim 1, wherein said annular groove is positioned at a boundary portion between the cylindrical opening head portion and the prismatic tubular barrel portion such that portions of said outer perimeter of said bottom groove wall at an outmost portion of said annular groove adjoin said prismatic tubular barrel portion via a curved transition portion.

12. The battery according to claim 11, wherein said positive electrode plate and said negative electrode plate are elongated strips.

13. The battery according to claim 2, wherein said annular groove is positioned at a boundary portion between the cylindrical opening head portion and said flat sides of the prismatic tubular barrel portion such that portions of said outer perimeter of said bottom groove wall at an outmost portion of said annular groove adjoin said flat sides via a curved transition portion and another portion of said outer perimeter of said bottom groove wall adjoins said slanted wall at a top of said straight contour of said slanted wall.

14. The battery according to claim 13, wherein said positive electrode plate and said negative electrode plate are elongated strips.

15. The battery according to claim 1, wherein said positive electrode plate and said negative electrode plate are elongated strips.

16. The battery according to claim 1, wherein said electrode plate group having a transverse cross section, transverse to said winding axis, that conforms with the prismatic tubular barrel cross section of said prismatic tubular barrel portion of said battery case.

* * * * *